(12) United States Patent
Sawyers-Abbott et al.

(10) Patent No.: US 9,670,877 B2
(45) Date of Patent: Jun. 6, 2017

(54) LINK ARM DRAG REDUCING DEVICE

(71) Applicant: United Technologies Corporation, Hartford, CT (US)

(72) Inventors: Nigel David Sawyers-Abbott, South Glastonbury, CT (US); Matthew Exner, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 402 days.

(21) Appl. No.: 14/320,829

(22) Filed: Jul. 1, 2014

(65) Prior Publication Data
US 2015/0016965 A1     Jan. 15, 2015

Related U.S. Application Data

(60) Provisional application No. 61/846,274, filed on Jul. 15, 2013.

(51) Int. Cl.
*F02K 1/76* (2006.01)
*F02K 1/72* (2006.01)

(52) U.S. Cl.
CPC ............... *F02K 1/763* (2013.01); *F02K 1/72* (2013.01); *Y02T 50/672* (2013.01)

(58) Field of Classification Search
CPC ........... F01D 17/162; F02K 1/72; F02K 1/763
USPC ....................................................... 415/145
See application file for complete search history.

(56) References Cited

U.S. PATENT DOCUMENTS

| | | | | |
|---|---|---|---|---|
| 2,778,564 A * | 1/1957 | Clarke | .................. | F01D 17/162 138/46 |
| 3,224,194 A * | 12/1965 | De Feo | ..................... | F01D 5/08 415/115 |
| 3,525,328 A * | 8/1970 | Crudden | ................ | F01D 17/16 126/285 R |
| 4,274,807 A * | 6/1981 | Kenney | ................. | F03D 7/0224 416/135 |
| 4,564,160 A | 1/1986 | Vermilye | | |
| 4,571,936 A | 2/1986 | Nash et al. | | |
| 4,807,434 A | 2/1989 | Jurich | | |
| 5,782,431 A | 7/1998 | Gal-Or et al. | | |
| 5,902,050 A | 5/1999 | Balczun et al. | | |
| 6,983,588 B2 | 1/2006 | Lair | | |
| 8,038,387 B2 * | 10/2011 | Houradou | ............. | F01D 17/162 384/215 |
| 8,104,262 B2 | 1/2012 | Marshall | | |
| 8,109,467 B2 | 2/2012 | Murphy | | |
| 8,197,196 B2 * | 6/2012 | Davis | .................... | F01D 17/162 219/201 |
| 8,251,646 B2 * | 8/2012 | Jahns | .................... | F01D 17/162 415/150 |

* cited by examiner

*Primary Examiner* — Dwayne J White
*Assistant Examiner* — Sang K Kim
(74) *Attorney, Agent, or Firm* — Kinney & Lange, P.A.

(57) ABSTRACT

A flowpath channel has a blade pivotally connected along a longitudinal axis thereof, at opposing top and bottom ends thereof, to respective top and bottom portions of the flowpath channel. The chord axis of the blade, between leading and trailing edges thereof, is capable of pivoting parallel to and skewed from the flowpath. The top end of the blade and an attachment structure secured to the flowpath channel each include a race. A bearing is disposed therebetween, and the blade is rotatable about the longitudinal axis.

20 Claims, 6 Drawing Sheets

LINK ARM DRAG REDUCING DEVICE

CROSS-REFERENCE TO RELATED APPLICATION(S)

This application claims priority to U.S. Provisional Application No. 61/846,274, filed on Jul. 15, 2013, and entitled "LINK ARM DRAG REDUCING DEVICE," the disclosure of which is incorporated by reference in its entirety.

BACKGROUND

This invention relates to cascade type thrust reversers for aircraft turbofan engines and, more particularly, to blocker door assemblies with drag links used in cascade type thrust reversers.

Modern aircraft turbofan engines have a nacelle or shroud surrounding the engine, spaced outwardly from a core engine cowl to define an annular passage or duct for flow of air rearward from the outer portion of a large fan or axial flow compressor. In this type of engine, a large proportion of the total thrust is developed by the reaction to the air driven rearward by the fan. The balance of the thrust results from ejection of the exhaust gas stream from the core engine.

Aircraft using gas turbine engines tend to have high landing speeds, placing great stress on wheel braking systems and requiring very long runways. To reduce this braking requirement and permit use of shorter runways, means are now provided in such engines for reversing a major portion of engine thrust during the landing roll. Many different types of thrust reversers have been designed.

With turbofan engines, it is possible to block and reverse substantially all of the fan flow without excessive stress on the system, since the core flow continues through the engine. In some cases, sufficient reverse flow can be obtained by blocking only a substantial portion of the fan flow. The most common type of thrust reverser used in turbofan engines utilizes sets of cascade vanes in the sidewalls of the engine nacelle with devices for uncovering the cascades to direct the airflow though the cascades, which turn the airflow in a reverse direction.

As turbofan engines become increasingly more complex and efficient, the higher their bypass ratios get. A higher bypass ratio in a turbofan engine leads to better fuel burn because the fan is more efficient at producing thrust than the core engine. As a consequence, the fan gets bigger, and the annular airflow duct between the nacelle and the core engine cowl gets taller. The introduction of a fan drive gear system for turbofan engines has also led to smaller engine cores. Smaller engine cores lead to shorter fan ducts, which are desirable so the heavy components of the engine are not hung out too far in front of the wings of the aircraft. As such, engine sub-systems are required to be packaged within smaller spaces.

The formation of a fan duct thrust reverser typically includes link arms that connect the blocker doors to the inner fixed structure. These link arms are frequently somewhat aerodynamically profiled. However, due to manufacturing costs and maintainability complications a single angle is chosen as a compromise in attempting to reduce the drag effects of the link arms in the fan duct.

SUMMARY

A flowpath channel has a blade pivotally connected along a longitudinal axis thereof, at opposing top and bottom ends thereof, to respective top and bottom portions of the flowpath channel. The chord axis of the blade, between leading and trailing edges thereof, is capable of pivoting parallel to and skewed from the flowpath. The top end of the blade and an attachment structure secured to the flowpath channel each include a race. A bearing is disposed therebetween, and the blade is rotatable about the longitudinal axis.

In one embodiment, a self-aligning drag link has a first end with a first aperture, a second end with a second aperture, a member having an axis connecting the first end with the second end, and an airflow modification device covering at least a portion of the member. The airflow modification device is configured to rotate with respect to the axis.

In another embodiment, an engine includes a first engine component and a second engine component spaced from the first engine component. The first engine component and the second engine component define a fluid flowpath. The engine also includes a strut between the first engine component and the second engine component. The strut has a first end pivotally connected to the first engine component, a second end pivotally connected to the second engine component, a member having an axis connecting the first end with the second end, and an airflow modification device covering at least a portion of the member. The airflow modification device is configured to rotate with respect to the axis.

DETAILED DESCRIPTION

Figure 1:
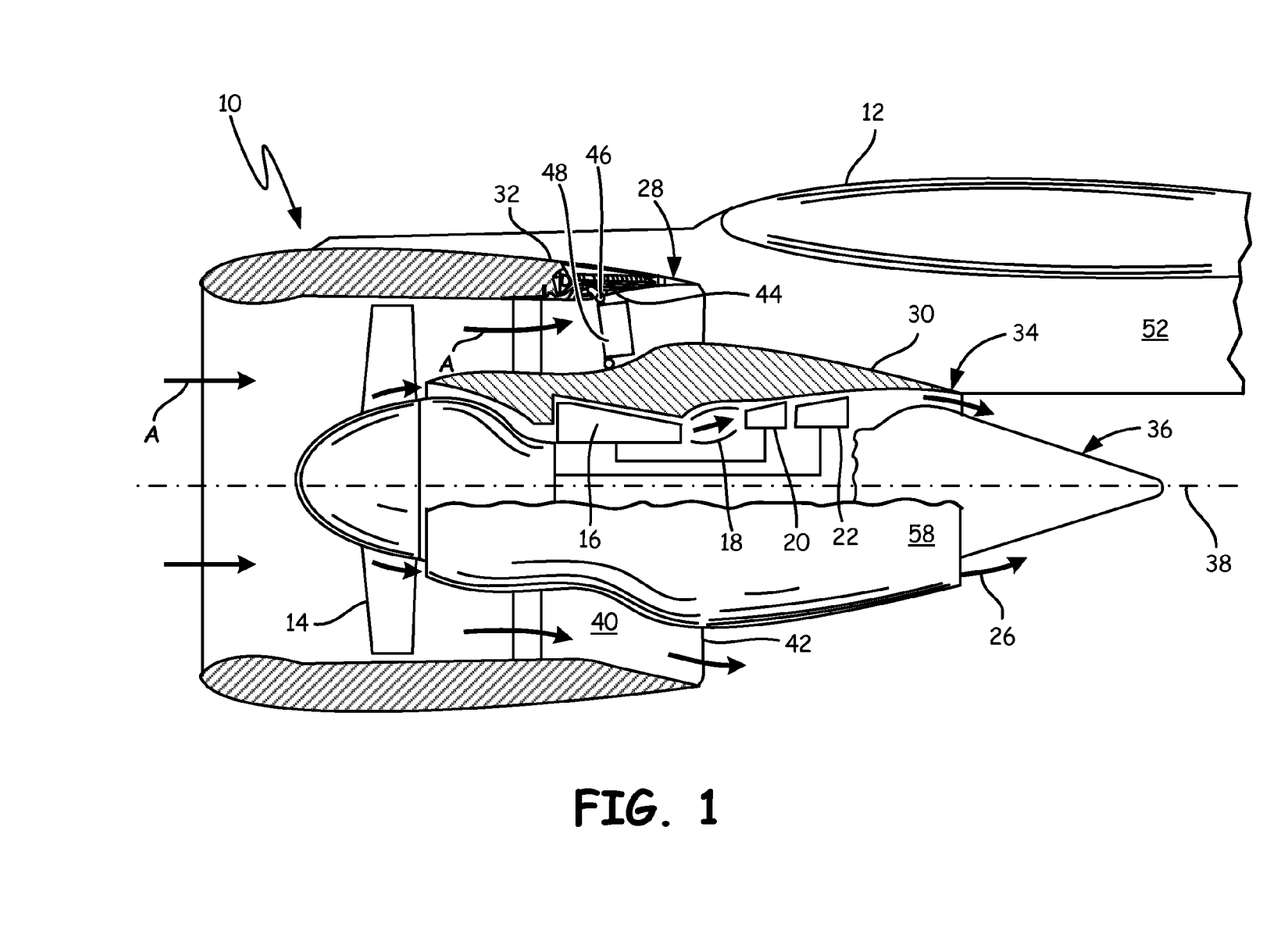
FIG. 1 is a cross-sectional view of a gas turbine engine.

The present disclosure is described with reference to several figures, in each of which like parts are identified and referenced with like numerals and characters. Illustrated in FIG. 1 is an exemplary turbofan aircraft gas turbine engine 10 mounted by a pylon to the wing of aircraft 12, shown in partial cross-section. The engine includes fan 14, multistage axial compressor 16, annular combustor 18, high pressure turbine 20, and low pressure turbine 22.

Although the disclosed non-limiting embodiment depicts a turbofan gas turbine engine, it should be understood that the concepts described herein are not limited to use with turbofans as the teachings may be applied to other types of turbine engines—for example, a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

Optionally, Compressor 16 can include both a low pressure compressor section and a high pressure compressor section.

During operation, air A is pressurized in compressor 16 and mixed with fuel in combustor 18 for generating hot combustion gases 26 which flow through high and low pressure turbines 20, 22, respectively, that extract energy therefrom. High pressure turbine 20 powers compressor 16 through a shaft therebetween, and low pressure turbine 22 powers fan 14 through another shaft therebetween.

The turbofan engine illustrated in FIG. 1 is a high bypass ratio engine in which most of the air pressurized by fan 14 bypasses the core engine for generating propulsion thrust. Airflow A from fan 14 is discharged from the engine through a substantially annular fan exhaust nozzle 28 defined radially between outer shell 30 of the core engine and fan nacelle 32 surrounding fan 14 and the forward portion of the core engine. Core exhaust gases 26 are discharged from the core engine through core exhaust nozzle 34 defined between outer shell 30 and center plug 36 disposed coaxially therein around axial centerline axis 38 of engine 10.

Conventional fan exhaust nozzles 28 include fan thrust reverser 40, which typically includes movable blocker doors 44. Blocker doors 44 are capable of being deployed into the fan duct upstream of nacelle trailing edge 42 for blocking the normal aft flow of the fan air for redirection in the forward direction through cooperating louvers disposed in the fan nacelle. Blocker doors 44 in the deployed position provide for reversing fan thrust during landing operation of the aircraft. Blocker door 44 is translated within the duct through movement of a connecting member, such as a drag link 46 that is covered by sail 48.

Figure 2:
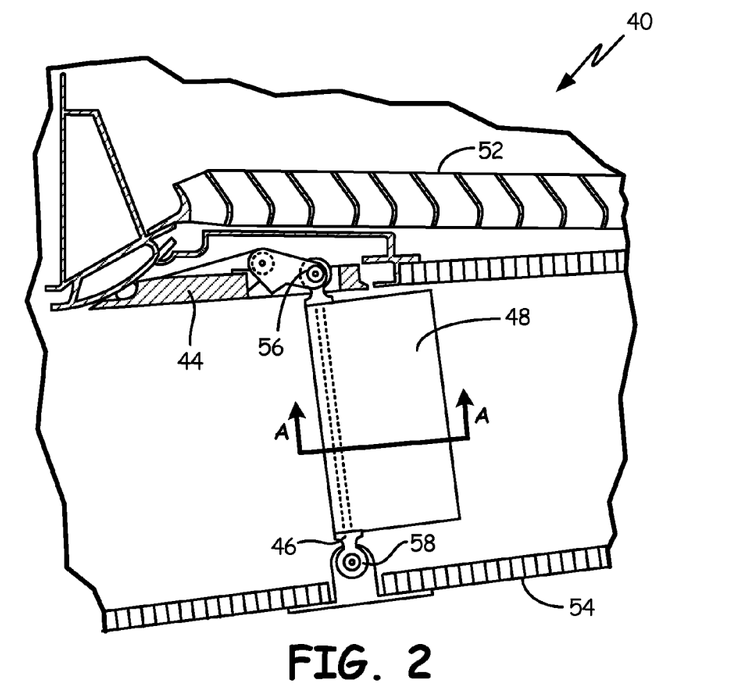
FIG. 2 is a partial cross-sectional view of a thrust reverser including a drag link with a sail.

FIG. 2 is a partial cross-sectional view of thrust reverser 40 including drag link 46 with sail 48. Thrust reverser 40 has blocker door 44 stowed in a portion of nacelle 32 of an aircraft. Thrust reverser 40 has a fore-and-aft translating sleeve (not visible in this view) to cover or expose thrust reverser cascades 52. Blocker doors 44 are also carried on the translating sleeve and linked to thrust reverser inner wall 54. Inner wall 54 may be the case and related structures of the engine core. The thrust reverser assembly is positioned just aft of the turbofan engine fan assembly. The thrust reverser assembly is fitted within nacelle 32. Thrust reverser cascades 52 are circumferentially spaced around the interior of nacelle 32.

During normal flying operations the translating sleeve is in a closed, or forward, position to cover the thrust reverser cascades 52. During landing, the translating sleeve is moved from the closed position to the rearwardly extended, or deployed, position by means of actuator rods (not shown). This positioning routes engine high by-pass fan air to flow through the thrust reverser cascades 52 so as to slow down the aircraft on the ground. Engine bypass fan air is rerouted through the thrust reverser cascades 52 by closing the circumferentially positioned blocker doors 44. When in the stowed position, airflow passes through fan exhaust nozzle 28. When thrust reverser 40 is deployed, the translating sleeve is moved aft to expose cascades 52, and blocker doors 44 are deployed to divert bypass fan airflow through the cascades 52.

Figure 2A:
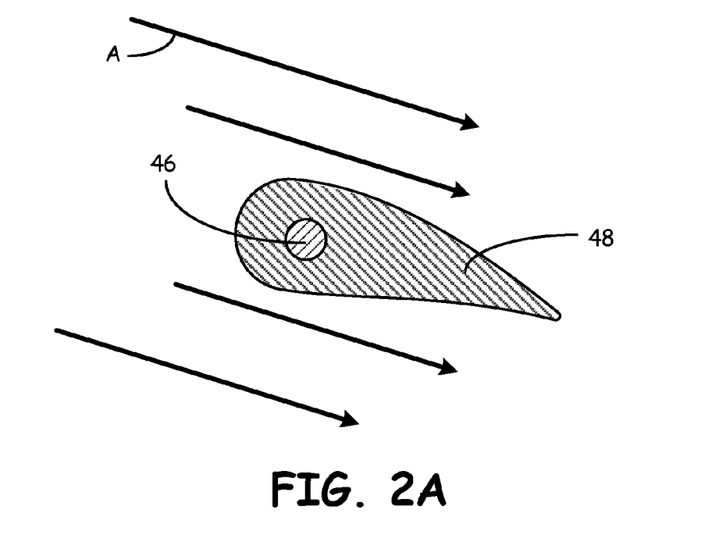
FIG. 2A is a cross-sectional view of the sail taken along line A-A.

Blocker doors 44 are actuated through linkage systems that include drag links 46. Drag link 46 is attached to nacelle 32 at first end 56, and to inner wall 54 via second end 58. A sail 48 may be attached to drag link 46. Sail 48 is an airflow modification device, and can be shaped like an airfoil. FIG. 2A is a cross-sectional view of drag link 46 and sail 48 taken along line A-A of FIG. 2. As illustrated, the cross-section of sail 48 is an airfoil. As airflow A passes sail 48, the airfoil shape will reduce drag by self-aligning to the localized free stream airflow.

Figure 3:
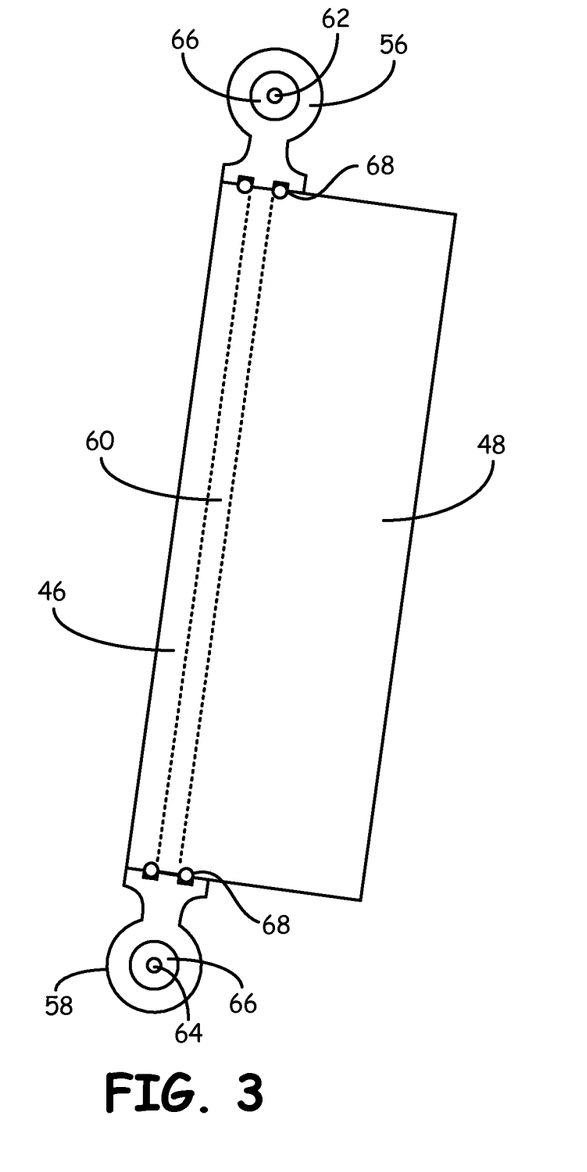
FIG. 3 is an elevation view of the drag link and sail.

FIG. 3 is an elevation view of drag link 46 and sail 48. Drag link 46 includes first end 56 and second end 58 connected by axial or longitudinal member 60. While illustrated as s a rod, member 60 may be a tube, stanchion, strut, tie, connecting rod, or similar rigid structure. Member 60 can be constructed from light-weight metal, metal alloys, or composite materials, and is circular in cross-section (see FIG. 2A), although other geometries are possible.

First end 56 and second end 58 each contain a respective aperture 62, 64 for the reception of a fastener to secure link 46 to other components of the engine. In one embodiment, apertures are located in spherical bearings 66, which allow for multi-axis rotation to secure drag link 46. First end 56 and second end 58 are constructed from light-weight metal, metal alloys, or composite materials and may be similar or the identical to that of member 60. First end 56, second end 58, and member 60 are permanently attached, and can be constructed from a single source of material.

Sail 48 extends between first end 56 and second end 58, and covers some or all of member 60. Sail 48 is also constructed from light-weight metal, metal alloys, or composite materials, which may be the same as that of member 60, though different materials from member 60 may be utilized. Sail 48 is an aerodynamic fairing or blade structure that may modify the airflow passing adjacent thereto, and may be manufactured as single piece, or multiple pieces secured together. Sail 48 contains an aperture therethrough for the reception of member 60. Rolling bearings 68 are located between first end 56 and sail 48, and second end 58 and sail 48. Bearings 68 may be, for example, roller, needle, ball, fluid, plain, etc., and may be tapered, straight, etc. Bearings 68 permit movement of sail 48 with respect to drag link 46. In one embodiment, bearings 68 are elastomeric bearings that allow for positioning of sail 48 to account for turbulent airflow A coming in contact therewith.

Figure 4:
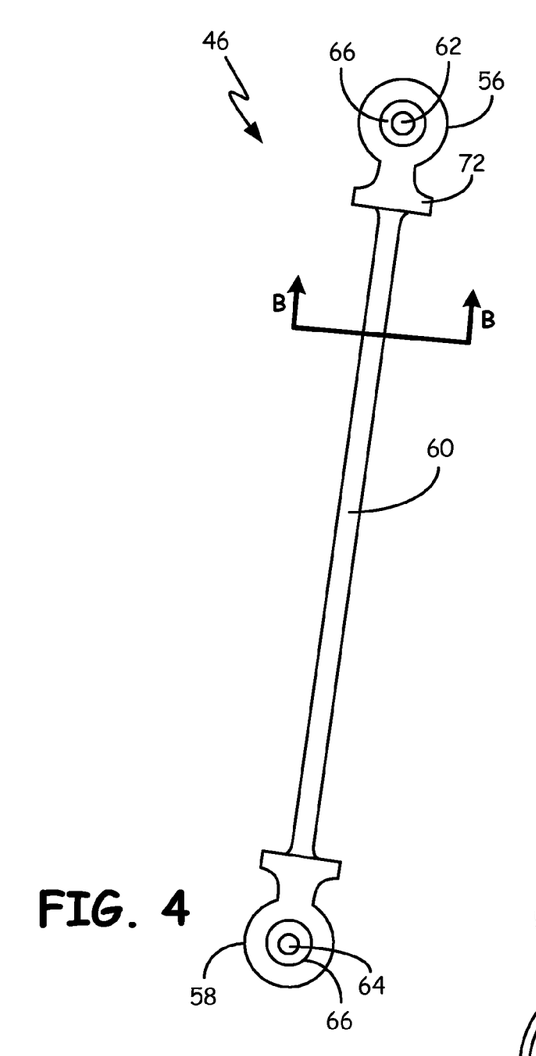
FIG. 4 is an elevation view of the drag link.
Figure 4A:
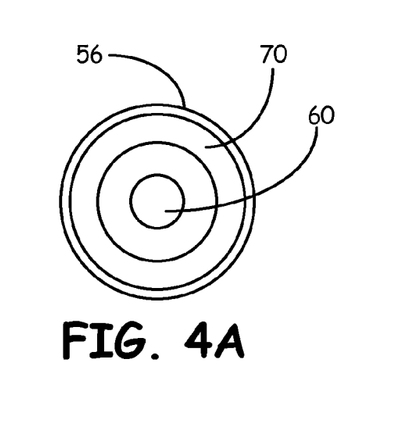
FIG. 4A is a plan view of the drag link taken along line B-B.

FIG. 4 is an elevation view of drag link 46, and FIG. 4A is a plan view of drag link 46 taken along line B-B. Drag link 46 is similar to that previously described herein. First end 56 contains lower portion 72 that includes bearing race 70. Race 70 is a cylindrical step cut into lower portion 72 capable of receiving bearing 68. A similar structure may also be present in second end 58.

Figure 5:
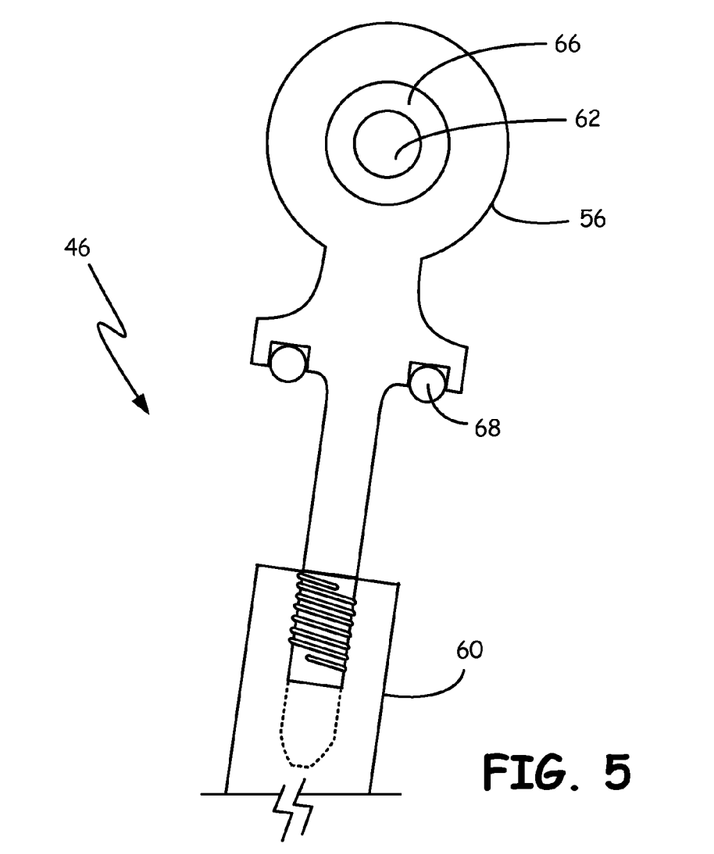
FIG. 5 is a partial elevation view of another embodiment of the drag link.

FIG. 5 is a partial elevation view of another embodiment of drag link 46. In this embodiment, first end 56 is in threaded engagement with member 60. The threaded engagement allows for the adjustment of the length of drag link 46. As such, differing sized sails 48 may be utilized with the structure of member 60 as illustrated. Further, differing sized bearings 68 may be utilized between drag link 46 and sail 48. Although illustrated as a threaded engagement, other means may be utilized for the attachment of first end 56 and/or second end 58 with member 60.

Figure 6:
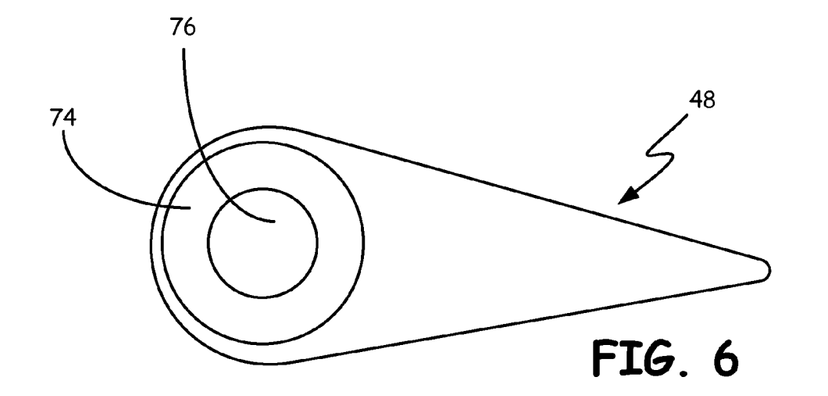
FIG. 6 is top plan view of the sail.

FIG. 6 is top plan view of sail 48 in which bearing race 74 is placed circumferentially around aperture 76. Bearing race 74 is a cylindrical step cut into the top surface of sail 48, and is capable of receiving bearing 68. As illustrated, aperture 76 has a circular cross-section, which permits reception of a cylindrical rod of member 60 (FIG. 4) therethrough. The configuration of a round member 60 and round aperture 76 permit rotation of sail 48 with respect to drag link 46. Aperture 76 is sized nominally larger in diameter than the outer diameter of member 60.

Figure 7:
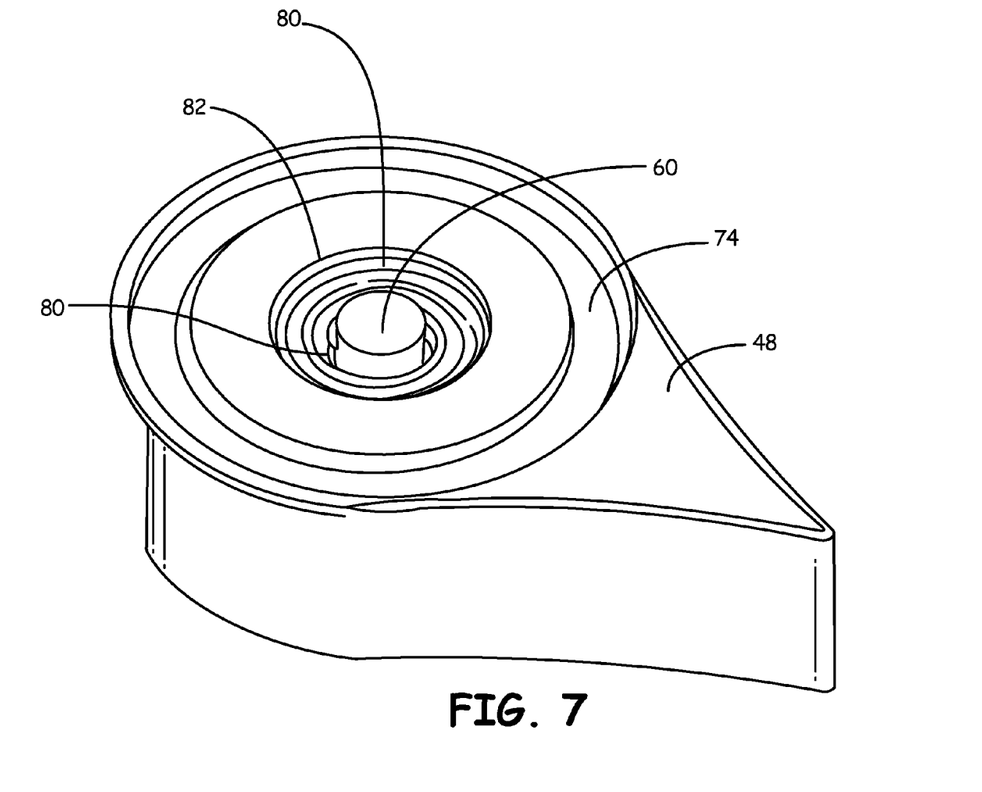
FIG. 7 is a top plan view of another embodiment of the sail.

FIG. 7 is a partial perspective view of drag link 46 and sail 48. Sail 48 contains bearing race 74 in the top surface thereof. Member 60 of drag link 46 is placed within aperture 76 of sail 48. Sail 48 also contains another circular cut-out 82 on the top surface. Spring 80 is placed within cut-out 82, and extends around and is attached to member 60 of drag link 46. Spring 80 inhibits the rotation of drag link 46 with respect to sail 48.

The previously described drag link and sail configuration allows for a self-aligning structure within the turbine nozzle flowpath. The aerodynamic sail pivots about the central axis of the drag link on the bearings therebetween. The sail aligns with the local airflow, and rotates on the bearing race at the upper and lower ends as close to the flow surfaces as possible. The above described drag link assembly is an improvement over the prior art that contain fixed structures that are less able to optimize airflow around the drag links. With a movable aerodynamic structure attached the drag link, airflow may be optimized through the nozzle to reduce the drag and other airflow disruptions associated with fixed structures. As the sail is able to self-align with the local flow, each drag link in the system will achieve the lowest possible drag and disruption to the airflow, which improves the thrust specific fuel consumption of the engine.

As the airflow is typically turbulent, flutter or vibration of the sail may cause excessive wear. Therefore, damping may be incorporated into the drag link assembly, such as the spring placed between the sail and the drag link. In an alternate embodiment, movement of the sail is inhibited through the use of an elastomeric bearing biased to default to a set position or angle. The airflow would still be allowed to deflect the sail as required, but the presence of the bearing would dampen any oscillations. The spring or elastomeric bearing may also prevent the sail from sticking at an off angle during lower flow rates of the airflow through the nozzle.

The drag link and sail arrangement may be utilized in other areas of the engine to reduce drag from similar structures, such as those between the turbine case and frame.

Discussion of Possible Embodiments

The following are non-exclusive descriptions of possible embodiments of the present invention.

Disclosed is a flowpath channel has a blade pivotally connected along a longitudinal axis, at opposing top and bottom ends, to respective top and bottom portions of the flowpath channel. The chord axis of the blade, between leading and trailing edges thereof, is capable of pivoting parallel to and skewed from the flowpath. The top end of the blade and an attachment structure secured to the flowpath channel each include a race. A bearing is disposed therebetween, and the blade is rotatable about the longitudinal axis.

The apparatus of the preceding paragraph can optionally include, additionally and/or alternatively, any one or more of the following features, configurations and/or additional components:

wherein the blade is an airfoil;

a spring between the blade and the first end;

wherein the top end and the bottom end each contain a pivotal portion;

wherein the pivotal portions include a captive spherical member with and aperture therethrough;

wherein the bearing is an elastomeric bearing;

wherein the bottom end of the blade and an attachment structure secured to the flowpath channel each include a race, and a bearing is disposed therebetween;

wherein the blade contains an aperture configured to receive a member extending from the attachment structure; and/or wherein the top end is attached to a spring.

In one embodiment, a self-aligning drag link has a first end with a first aperture, a second end with a second aperture, a member having an axis connecting the first end with the second end, an airflow modification device covering at least a portion of the member and pivotally connected along the longitudinal axis to the member, and a spring attached to the airflow modification device and the member. The airflow modification device is configured to rotate with respect to the axis.

The drag link of the preceding paragraph can optionally include, additionally and/or alternatively, any one or more of the following features, configurations and/or additional components:

a bearing between the first end and the airflow modification device;

a bearing between the second end and the airflow modification device;

wherein the airflow modification device is an airfoil;

wherein the first end and the member are connected through a threaded engagement; and/or wherein the first end includes a spherical bearing.

In another embodiment, an engine includes a first engine component and a second engine component spaced from the first engine component. The first engine component and the second engine component define a fluid flowpath. The engine also includes a strut between the first engine component and the second engine component. The strut has a first end pivotally connected to the first engine component, a second end pivotally connected to the second engine component, a member having an axis connecting the first end with the second end, and an airflow modification device covering at least a portion of the member. The airflow modification device is configured to rotate about the longitudinal axis.

The engine of the preceding paragraph can optionally include, additionally and/or alternatively, any one or more of the following features, configurations and/or additional components:

wherein the first engine component comprises an engine case;

wherein the first end and the second end each include a spherical bearing;

a first bearing between the first end and a first end of the airflow modification device;

a second bearing between the second end the and a second end of the airflow modification device; and/or a spring between the first end and the first end of the airflow modification device.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flowpath channel comprising:
   a blade, pivotally connected along a longitudinal axis thereof, at opposing top and bottom ends thereof, to respective top and bottom portions of the flowpath channel, so that a chord axis of the blade, between leading and trailing edges thereof, is capable of pivoting parallel to and skewed from the flowpath; wherein
   a top surface of the top end of the blade includes a first race, and a lower portion of a first attachment structure secured to the flowpath channel includes a second race, and wherein a first bearing is disposed within the first and second races, and whereby the blade is rotatable about the longitudinal axis.

2. The flowpath channel of claim 1 wherein the blade is an airfoil.

3. The flowpath channel of claim 1 further comprising:
   a spring between the blade and the first attachment structure.

4. The flowpath channel of claim 1 further comprising:
   a second attachment structure opposite the first attachment structure, wherein the first and second attachment structures each contain a pivotal portion.

5. The flowpath channel of claim 4 wherein the pivotal portions include a captive spherical member with an aperture therethrough.

6. The flowpath channel of claim 1 wherein the first bearing is a ball bearing.

7. The flowpath channel of claim 1 wherein the bottom end of the blade includes a third race, and a second attachment structure secured to the flowpath channel includes a fourth race, and wherein a second bearing is disposed within the third and fourth races.

8. The flowpath channel of claim 1 wherein the blade contains an aperture configured to receive a member extending from the first attachment structure.

9. The flowpath channel of claim 1 wherein the top end receives a spring.

10. A self-aligning drag link comprising:
    a first end with a first aperture;
    a second end with a second aperture;
    a member having a longitudinal axis connecting the first end with the second end;
    an airflow modification device covering at least a portion of the member and pivotally connected along the longitudinal axis to the member; and
    a spring located within the airflow modification device and attached to the member;
    wherein the airflow modification device is configured to rotate about the longitudinal axis.

11. The drag link of claim 10 further comprising:
    a first bearing between the first end and the airflow modification device.

12. The drag link of claim 11 further comprising:
    a second bearing between the second end and the airflow modification device.

13. The drag link of claim 10 wherein the airflow modification device is an airfoil.

14. The drag link of claim 10 wherein the first end and the member are connected through a threaded engagement.

15. The drag link of claim 10 wherein the first end includes a spherical bearing.

16. An engine comprising:
    a first engine component;
    a second engine component spaced from the first engine component, wherein the first engine component and the second engine component define a fluid flowpath;
    a strut between the first engine component and the second engine component, the strut comprising:
      a first end pivotally connected to the first engine component;
      a second end pivotally connected to the second engine component;
      a member having a longitudinal axis connecting the first end with the second end; wherein
      a lower portion of the first end includes a first race;
    an airflow modification device covering at least a portion of the member; wherein
      a top surface on a top end of the airflow modification device includes a second race; and
    a first bearing positioned within the first race on the strut and the second race on the airflow modification device; wherein the airflow modification device is configured to rotate with respect to the longitudinal axis.

17. The engine of claim 16 wherein the first engine component comprises an engine case.

18. The engine of claim 17 wherein the first end and the second end each include a spherical bearing.

19. The engine of claim 16 wherein the strut further comprises:
    a second bearing between the second end of the strut and a bottom end of the airflow modification device.

20. The engine of claim 19 wherein the strut further comprises:
    a spring located within the airfoil modification device and attached to the member of the strut.

* * * * *